Figure 1:
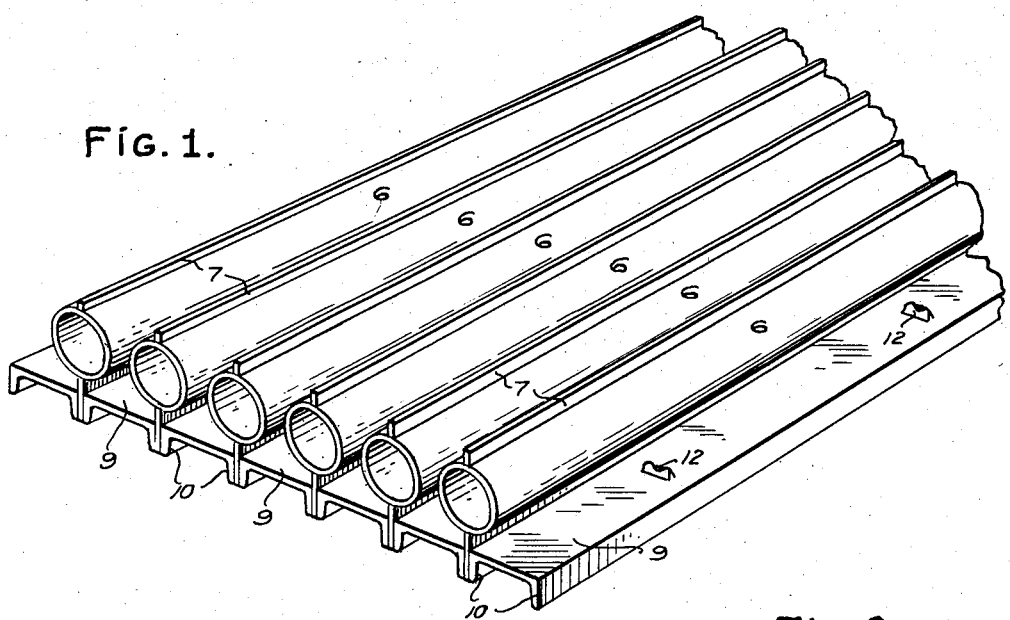

April 28, 1959     C. A. SEDERLUND     2,883,728
FORM FOR MOLDING CONCRETE I-BEAMS Filed May 2, 1955     2 Sheets-Sheet 1

INVENTOR.
CONRAD A. SEDERLUND,
BY
ATTORNEY

April 28, 1959  C. A. SEDERLUND  2,883,728
FORM FOR MOLDING CONCRETE I-BEAMS
Filed May 2, 1955  2 Sheets-Sheet 2

INVENTOR.
CONRAD A. SEDERLUND,
BY
ATTORNEY

United States Patent Office 2,883,728
Patented Apr. 28, 1959

2,883,728

FORM FOR MOLDING CONCRETE I-BEAMS

Conrad A. Sederlund, Boca Raton, Fla.

Application May 2, 1955, Serial No. 505,312

3 Claims. (Cl. 25—121)

This invention relates to improvements in molds and has particular reference to a mold for casting a concrete I-beam of the character illustrated in my co-pending application, Serial No. 456,160, filed Sept. 15, 1954.

The invention contemplates the parallel assembly of a plurality of similar mold dividers and pallets and with each pair of adjacent mold dividers constituting a void into which a concrete mix is poured whereby to conform to the cross-sectional configuration of the void.

An object of the invention resides in providing a plurality of mold dividers having identically shaped sides that are rigidly clamped in parallel spaced relation whereby to form a plurality of identical voids between adjacent mold dividers and having a cross-sectional configuration substantially of an I-shape and whereby each mold divider member serves to form one side of adjacent concrete I-beams being molded.

Another object of the invention resides in the means for supporting the several mold divider members in their parallel spaced relation and with such means constituting the mold pallet.

A further object of the invention consists of novel mold dividers that comprise each an elongated cylindrical member and diametrically oppositely disposed fins welded thereto and for their full length whereby to provide division walls with the cylindrical member and with one fin being formed relatively deeper for clamping engagement between the pallets.

Another object of the invention resides in novel wedge-shaped chairs welded to the upper surface of each pallet member whereby to support a reinforcing rod centrally of and in spaced relation to said pallet.

A still further object of the invention resides in a novel clamp device whereby to quickly and easily clamp a plurality of mold dividers in operative relation to the pallet.

A still further object of the invention resides in quickly detachable end closure plates that are shaped to conform to the cross-sectional configuration of the voids and with the plates being so constructed as to permit their mounting within the voids after assembly of the mold dividers and at any desired point within the voids in accordance with the length of beam to be cast.

Other objects and advantages of the invention will be clearly apparent during the course of the following description, reference being had to the accompanying drawings wherein has been illustrated a preferred form of the device and wherein like characters of reference are employed to denote like parts throughout the several figures.

Figure 2:
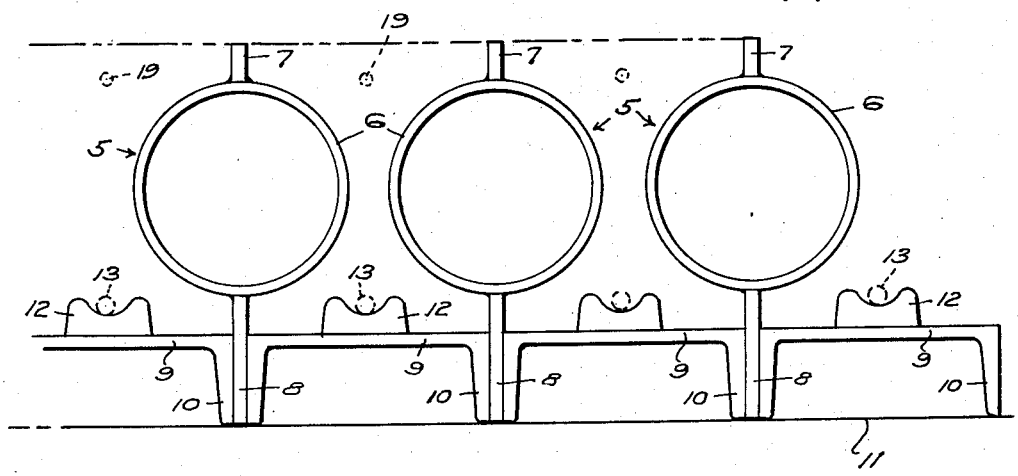
Figure 3:
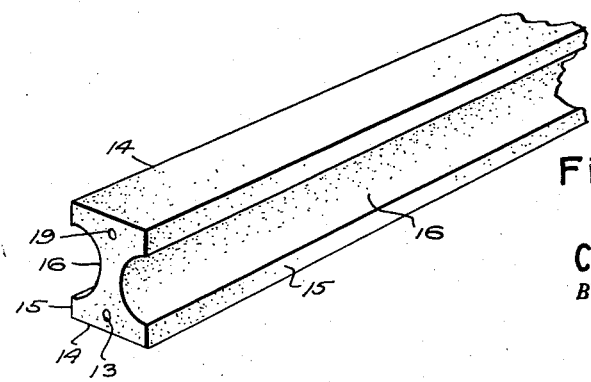
Figure 4:
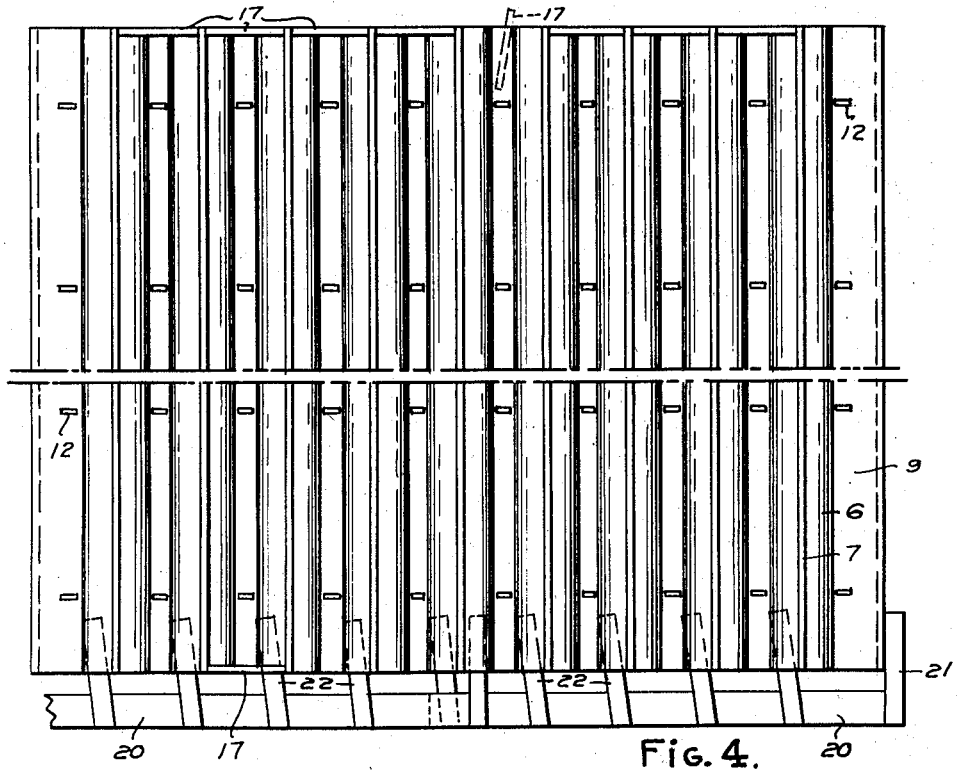
Figure 5:
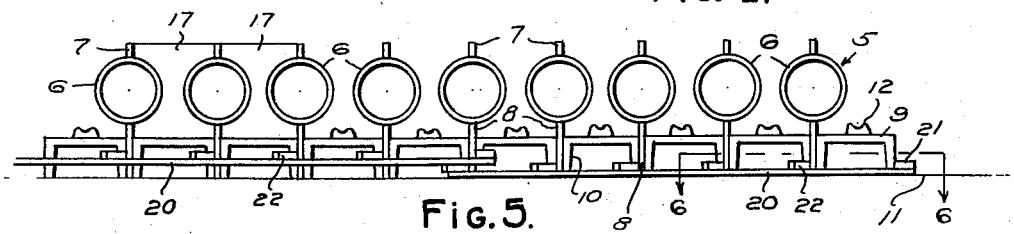
Figure 7:
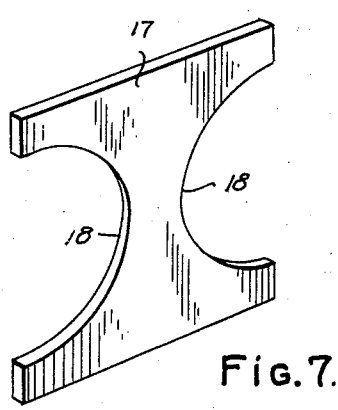
Figure 6:
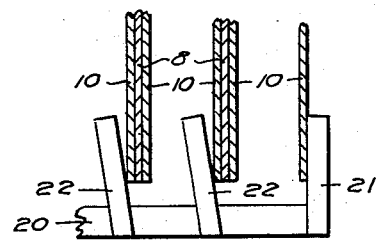

In the drawings:

Figure 1 is a perspective view of a group of form members in operative relation, Figure 2 is an enlarged end view of a plurality of form members in operative relation, Figure 3 is a fragmentary perspective view of an I-beam formed by the mold, Figure 4 is a top plan view of a group of form members in clamped operative relation, Figure 5 is an end view of the structure shown in Figure 4, Figure 6 is a fragmentary horizontal section taken substantially on line 6—6 of Figure 5, and Figure 7 is a perspective view of a closure plate.

Referring specifically to the drawings, the numeral 5 designates the form members as a whole. The form members are identical in construction whereby they may be used in multiple for the simultaneous casting of a plurality of concrete I-beams, such as that indicated in Figure 3. Each mold divider member comprises an elongated cylindrical tube 6 and with the tube 6 being open at its opposite ends and having a length corresponding to the length of the beam to be formed. Welded or otherwise rigidly connected with the tube 6 and at diametrically opposite points are radial fin members 7 and 8. The fin members 7 and 8 are coextensive with the tube. Thus, the fins 7 and 8 constitute division walls for the mold. The fin 8 is adapted to be clamped between a pair of identical and coacting elongated channel-shaped pallet members 9 whereby the fins and the connected tube 6 may be disposed in a vertical plane when the device is in the mold forming position. The fin 8, as clearly shown, is formed relatively deeper than the fin 7 whereby to support the tube 6 at an elevation to expose an area of the fin 8 corresponding to the width of the fin 7. The pallets 9 and their downturned legs 10, together with the fin 8, are supported upon a surface 11, such as a work table or a vibrator table. Each of the pallets 9 is provided upon its upper surface with a plurality of spaced apart and centrally disposed concave and wedge-shape chairs 12 whereby to support a reinforcing rod 13 in an elevated position above and substantially parallel with the bottom of the void, such elevation being calculated as the proper embedding depth of the rod.

As clearly shown in Figure 3, the beam to be cast is of a predetermined height and width and has flat upper and lower faces 14 and with its side walls 15 shaped to provide oppositely disposed semi-cylindrical grooves 16. It will therefore be clearly apparent that, with the mold dividers 5 being clamped together in a position shown in Figure 2, the fins 7 and 8, together with the tubes 6 of a pair of adjacent forms 5, provide a void of substantially I-shape in cross-section. The fins 7 and 8 are formed of relatively heavy gauge metal that will support the forms in their clamped position against any tendency to flex to either side as the concrete mix is being poured therein. The tube 6 may be a metal pipe section of predetermined diameter, while the pallets 9 are of conventional construction of predetermined width.

In use, any desired number of mold dividers 5 and pallets 9 are supported upon a work surface which could conceivably be a vibrator table of any well known construction. The mold dividers 5 are progressively arranged parallel with the table and with the fins 8 engaged against an adjacent downturned leg 10 of a pallet 9. The next adjacent pallet 9 is then shifted against the fin 8, supporting the mold divider in an upright position. The other mold dividers are then progressively moved toward each other and clamped in upright position by the adjacent downturned legs 10 engaging their respective fins 8. The several downturned legs 10 are then forced into clamping engagement with the adjacent fins 8 by suitable clamping devices, to be described, thus rigidly supporting a plurality of mold dividers in accurately spaced and parallel relation whereby to form the several open molds into which the concrete is to be poured and with the surfaces of the pallets 9 constituting the bottoms of the molds. The reinforcing rods 13 may be disposed upon the chairs 12 either before or after assembly of the mold units in clamped relationship. With the several molds in clamped position, as shown, it becomes necessary that means be provided to close the opposite ends of the mold and to facilitate such closure there has been provided closure plates 17, illustrated more clearly in Figure 7. The closure plates 17 are preferably formed of a gauge of metal similar to the fins 7 and 8. The plates 17 have a height corresponding to the height of the mold, determined by the height of the fin 7 and the opposite edges of the plates 17 have been cut away to form semi-cylindrical notches 18 having an arc corresponding to the diameter of the tubes 6. The plates 17 thus are shaped to snugly engage within the normally open ends of the mold to closely conform to the tubes 6 and to the fins 7 and 8. The plates 17 may be held in end closure position by any desirable means or with the device in assembled relationship it has been found that frictional contact with the tubes 6 and the fins 7 and 8 have been adequate to maintain the plates in closure position. The plates 17 may be engaged directly into the ends of the mold and forced into frictional engagement therewith, or they may be inserted between the spaced tubes 6 in the manner illustrated in dotted lines in Figure 4 and then twisted around to the full line position. This would be particularly true should the operator have occasion to mold beams of a length shorter than the over-all length of the mold and, in such case, the plates 17 are engaged edgewise between the tubes 6 and twisted into wall forming position with relatively little effort. With the several molds in rigid supported position and with the end plates 17 in their closure position, it being assumed that the reinforcing rods 13 have been previously engaged with the chairs 12, the operator proceeds to pour the concrete mix simultaneously into the several mold voids, using a straight edge level across the upper edges of the fins 7. Should the supporting structure 11 be a vibrator table, the entire group of molds and the mass of concrete therein is suitably vibrated to impart density to the beams, after which they are permitted to set a predetermined length of time calculated to impart adequate strength thereto prior to the stripping of the forms, after which the cast beams may be elevated from the pallets 9 and conveyed to a point for additional curing. Prior to the initial setting of the concrete mix, upper reinforcing rods 19 are embedded manually into the concrete to a desired depth. The wedge shape of the chairs 12 permit the beam to be lifted from the pallets 9 with the rods 13 embedded therein and the chairs 12 are permanent with respect to the pallets 9 and avoid the use of expendable chairs that are commonly employed and that remain embedded in the concrete.

Since the several mold dividers are to be clamped in operative relationship, as before pointed out, means have been provided whereby a simple and highly effective clamp device has been provided to clamp the several downturned legs 10 against the fins 8. Such clamp devices have been more clearly illustrated in Figures 4, 5 and 6 and comprise a bar 20 having a right angle holding arm 21 and a plurality of spaced apart angularly disposed wedging arms 22 welded thereto. The leg 21 engages against the outer face of the outermost downturned leg 10 of the outermost pallet 9, while the wedging arms 22 engage upon the inner face of corresponding downturned legs 10 of the several next adjacent pallets 9 and, when forced inwardly, exert a wedging action against the several downturned legs causing the pallets to be shifted in a manner to securely clamp the fins 8 between adjacent downturned legs of the pallets 9. The clamps will obviously be employed at opposite ends of the mold to successfully clamp the several forms against shifting under the influence of the weight of the concrete mix being poured therein. Wherein multiple molds are employed and to facilitate the handling of the clamp devices, two or more of the clamps may be employed, as illustrated in Figures 4 and 5, in such case the second clamp will overlie the terminal end of the first clamp and impart a continuous clamping action to an additional group of forms in the manner just described. This type of clamp is extremely simple and avoids the use of threaded fastening devices or other more expensive clamps that are difficult to assemble with respect to the forms. The clamps are quickly and easily engaged with the forms and just as easily and quickly released therefrom.

It will be apparent from the foregoing that an extremely simple and economical form has been provided whereby to cast a multiple group of concrete I-beams having a configuration illustrated. The forms are quickly and easily assembled and clamped into operative position and are quickly and easily disassembled when they are to be stripped from the beams after casting. The structure sets up a combination of elements whereby the forms are quickly and easily disposed in their mold forming position, and with each form serving to simultaneously cast the side of adjacent beams to form the longitudinal grooves. The chairs 12 serve to properly support the lower reinforcing rods 13 at their proper elevation to be embedded within the beam and offer no impediment to the removal of the beam from the pallets 9. The fins 8 properly support the forms at an elevation above the pallets 9 whereby to expose an area of the fin corresponding to the width of the fin 7, thus providing a substantially identical area of the side walls 15 of the beam, while the tubes 6 serve to mold the semi-cylindrical grooves equidistantly spaced from the top and bottom of the beams. In disassembled relation, the parts are easily cleaned and may be conveniently handled for storage or the like.

It is to be understood that the invention is not limited to the precise construction shown, but that changes are contemplated as readily fall within the spirit of the invention as determined by the scope of the subjoined claims.

Having described my invention, what I claim as new and desire to secure by Letters Patent is:

1. A mold for casting a plurality of similar concrete beams comprising, a plurality of elongated channel shaped parallel aligned pallet members, each of said pallet members having a plane molding surface, a first downturned longitudinally extending leg at one side of said plane molding surface and a second downturned longitudinally extending leg at the other side of said plane molding surface, said first-mentioned downturned leg of one pallet member being in aligned lateral relation to said second-mentioned downturned leg of an adjacent pallet member to form a bottom for said mold, a plurality of elongated mold dividers, each of said mold dividers being vertically disposed between said laterally aligned downturned legs of said pallet members, a clamp at each end of a plurality of said pallet members, each clamp having a bar extending transversely of the ends of said pallet members, a holding arm rigidly mounted at one end of said bar and extending at a right angle to said bar, said holding arm engaging the outside of said first-mentioned downturned leg of one of said pallet members, a plurality of wedging arms rigidly mounted in spaced relation on said bar, each of said wedging arms lying in the plane of said holding arm and having one edge angularly disposed at more than a right angle away from said holding arm, said angularly disposed edges of said wedging arms engaging the inner surface of each of said first-mentioned downturned legs of each successive pallet member of said plurality of pallet members, whereby to force said pallet members toward each other to clamp the said mold dividers therebetween when said clamping bars are forced into the respective ends of said pallet members.

2. A mold for casting a plurality of similar concrete I-beams comprising, a plurality of elongated channel shaped parallel aligned pallet members, each of said pallet members having a plane molding surface, a first downturned longitudinally extending leg at one side of said plane molding surface and a second downturned longitudinally extending leg at the other side of said plane molding surface, said first mentioned downturned leg of one pallet member being in aligned lateral relation to said second mentioned downturned leg of an adjacent pallet member to form a bottom for said mold, a plurality of elongated mold dividers, each of said mold dividers having a longitudinally extending cylindrical center portion and a pair of oppositely extending radial fins, one fin of each mold divider being vertically disposed between said laterally aligned downturned legs of said pallet members, a clamp at each end of a plurality of said pallet members, each clamp having a bar extending transversely of the ends of said pallet members, a holding arm rigidly mounted at one end of said bar and extending at a right angle to said bar, said holding arm engaging the outside of said first-mentioned downturned leg of one of said pallet members, a plurality of wedging arms rigidly mounted in spaced relation on said bar, each of said wedging arms lying in the plane of said holding arm and having one edge angularly disposed at more than a right angle away from said holding arm, said angularly disposed edges of said wedging arms engaging the inner surface of each of said first-mentioned downturned legs of each successive pallet member of said plurality of pallet members, whereby to force said pallet members toward each other to clamp the said mold dividers therebetween when said clamping bars are forced into the respective ends of said pallet members.

3. A mold for casting a plurality of similar concrete beams having a reinforcement rod embedded in each beam comprising, a plurality of elongated channel shaped parallel aligned pallet members, each of said pallet members having a plane molding surface, a first downturned longitudinally extending leg at one side of said plane molding surface and a second downturned longitudinally extending leg at the other side of said plane molding surface, said first-mentioned downturned leg of one pallet member being in aligned lateral relation to said second-mentioned downturned leg of an adjacent pallet member to form a bottom for said mold, a plurality of elongated mold dividers, each of said mold dividers being vertically disposed between said laterally aligned downturned legs of said pallet members, a plurality of chairs for holding reinforcement rods, said chairs being fixedly mounted on said plane molding surface of each of said pallet members, said chairs having inwardly and upwardly tapering sides, a clamp at each end of a plurality of said pallet members, each clamp having a bar extending transversely of the ends of said pallet members, a holding arm rigidly mounted at one end of said bar and extending at a right angle to said bar, said holding arm engaging the outside of said first-mentioned downturned leg of one of said pallet members, a plurality of wedging arms rigidly mounted in spaced relation on said bar, each of said wedging arms lying in the plane of said holding arm and having one edge angularly disposed at more than a right angle away from said holding arm, said angularly disposed edges of said wedging arms engaging the inner surface of each of said first-mentioned downturned legs of each successive pallet member of said plurality of pallet members, whereby to force said pallet members toward each other to clamp the said mold dividers therebetween when said clamping bars are forced into the respective ends of said pallet members.

References Cited in the file of this patent

UNITED STATES PATENTS

| | | |
|---|---|---|
| 898,911 | Neeley | Sept. 15, 1908 |
| 1,099,171 | Evers | June 9, 1914 |
| 1,220,526 | Marshall | Mar. 27, 1917 |
| 1,480,058 | Goldie | Jan. 8, 1924 |
| 1,507,515 | Potter | Sept. 2, 1924 |

FOREIGN PATENTS

| | | |
|---|---|---|
| 722,168 | France | Aug. 26, 1931 |